United States Patent
Tanaka et al.

(10) Patent No.: US 11,443,743 B2
(45) Date of Patent: Sep. 13, 2022

(54) VOICE CONTROL INFORMATION OUTPUT SYSTEM, VOICE CONTROL INFORMATION OUTPUT METHOD, AND RECORDING MEDIUM

(71) Applicant: Panasonic Intellectual Property Management Co., Ltd., Osaka (JP)

(72) Inventors: Keiichi Tanaka, Osaka (JP); Kiyonori Kido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 144 days.

(21) Appl. No.: 16/970,404

(22) PCT Filed: Jan. 15, 2019

(86) PCT No.: PCT/JP2019/000955
§ 371 (c)(1),
(2) Date: Aug. 17, 2020

(87) PCT Pub. No.: WO2019/163333
PCT Pub. Date: Aug. 29, 2019

(65) Prior Publication Data
US 2021/0118441 A1   Apr. 22, 2021

(30) Foreign Application Priority Data
Feb. 22, 2018  (JP) ............................. JP2018-029713

(51) Int. Cl.
G10L 15/22   (2006.01)
G06F 3/16    (2006.01)
G10L 15/30   (2013.01)

(52) U.S. Cl.
CPC .............. *G10L 15/22* (2013.01); *G06F 3/167* (2013.01); *G10L 15/30* (2013.01); *G10L 2015/223* (2013.01)

(58) Field of Classification Search
CPC ....................................................... G10L 15/22
See application file for complete search history.

(56) References Cited

U.S. PATENT DOCUMENTS

2012/0086877 A1*  4/2012  Kaoh ................. H04N 21/8153
                                                          348/739
2015/0243287 A1    8/2015  Nakano
2017/0017763 A1*  1/2017  Zimmer ................. G16H 40/63

FOREIGN PATENT DOCUMENTS

| JP | 2016-014967   | * | 1/2016 |
| JP | 2016-14967  A |   | 1/2016 |
| JP | 2016-134770 A |   | 7/2016 |
| WO | 2014/171144 A1|   | 10/2014 |

OTHER PUBLICATIONS

International Search Report (ISR) (with English translation) and Written Opinion (WO) dated Mar. 26, 2019 in corresponding International (PCT) Application No. PCT/JP2019/000955.

* cited by examiner

*Primary Examiner* — Ibrahim Siddo
(74) *Attorney, Agent, or Firm* — Renner, Otto, Boisselle & Sklar, LLP

(57) ABSTRACT

A voice control information output system includes: a voice control information obtainment unit that obtains voice control information for controlling a device based on a voice received by a voice input terminal, from a voice control system that outputs the voice control information; and an output unit that outputs display-related information for displaying a content related to the voice control information.

11 Claims, 10 Drawing Sheets

VOICE CONTROL INFORMATION OUTPUT SYSTEM, VOICE CONTROL INFORMATION OUTPUT METHOD, AND RECORDING MEDIUM

TECHNICAL FIELD

The present invention relates to a voice control information output system, a voice control information output method, and a recording medium.

BACKGROUND ART

A service for operating a device using voice, referred to as virtual personal assistance (VPA), is becoming popular. Patent literature (PTL) 1 discloses a voice control system for controlling the operation of a device by receiving a natural sentence using voice.

CITATION LIST

Patent Literature

PTL 1: WO2014/171144

SUMMARY OF THE INVENTION

Technical Problem

In a voice control system, information related to voice control information for controlling a device based on a voice received from a user is outputted to the user using voice. For example, in response to a voice input of "Turn on the air conditioner." from a user, a voice sound of "Turning on the air conditioner." is outputted from the voice control system. With respect to this, there is a growing demand to visually check the information related to the voice control information.

The present invention provides a voice control information output system that allows a user to visually check the information related to the voice control information.

Solutions to Problem

A voice control information output system according to an aspect of the present invention includes a voice control information obtainment unit that obtains voice control information for controlling a device based on a voice received by a voice obtainment unit, from a voice control system that outputs the voice control information; and an output unit that outputs display-related information for displaying a content related to the voice control information.

A voice control information output method according to another aspect of the present invention includes: obtaining voice control information for controlling a device based on a voice received by a voice obtainment unit, from a voice control system that outputs the voice control information; and outputting display-related information for displaying a content related to the voice control information.

A recording medium according to another aspect of the present invention is a non-transitory computer-readable recording medium for use in a computer, the recording medium having a computer program recorded thereon for causing the computer to execute the above-mentioned voice control information output method.

Advantageous Effect of Invention

According to the present invention, it is possible to visually check the information related to the voice control information.

DESCRIPTION OF EXEMPLARY EMBODIMENTS

The following describes embodiments with reference to the drawings. It should be noted that the following embodiments show comprehensive or specific illustrations. The numerical values, shapes, structural components, the arrangement and connection of the structural components, steps, the processing order of the steps, etc. shown in the following embodiments are mere examples, and thus are not intended to limit the present invention. Of the structural components described in the following embodiments, structural components not recited in any one of the independent claims that indicate the broadest concepts of the present invention will be described as optional structural components.

The figures are schematic illustrations and not necessarily precise illustrations. In the figures, substantially identical components are assigned the same reference signs, and overlapping descriptions thereof may be omitted or simplified.

EMBODIMENT

Configuration

Figure 1:
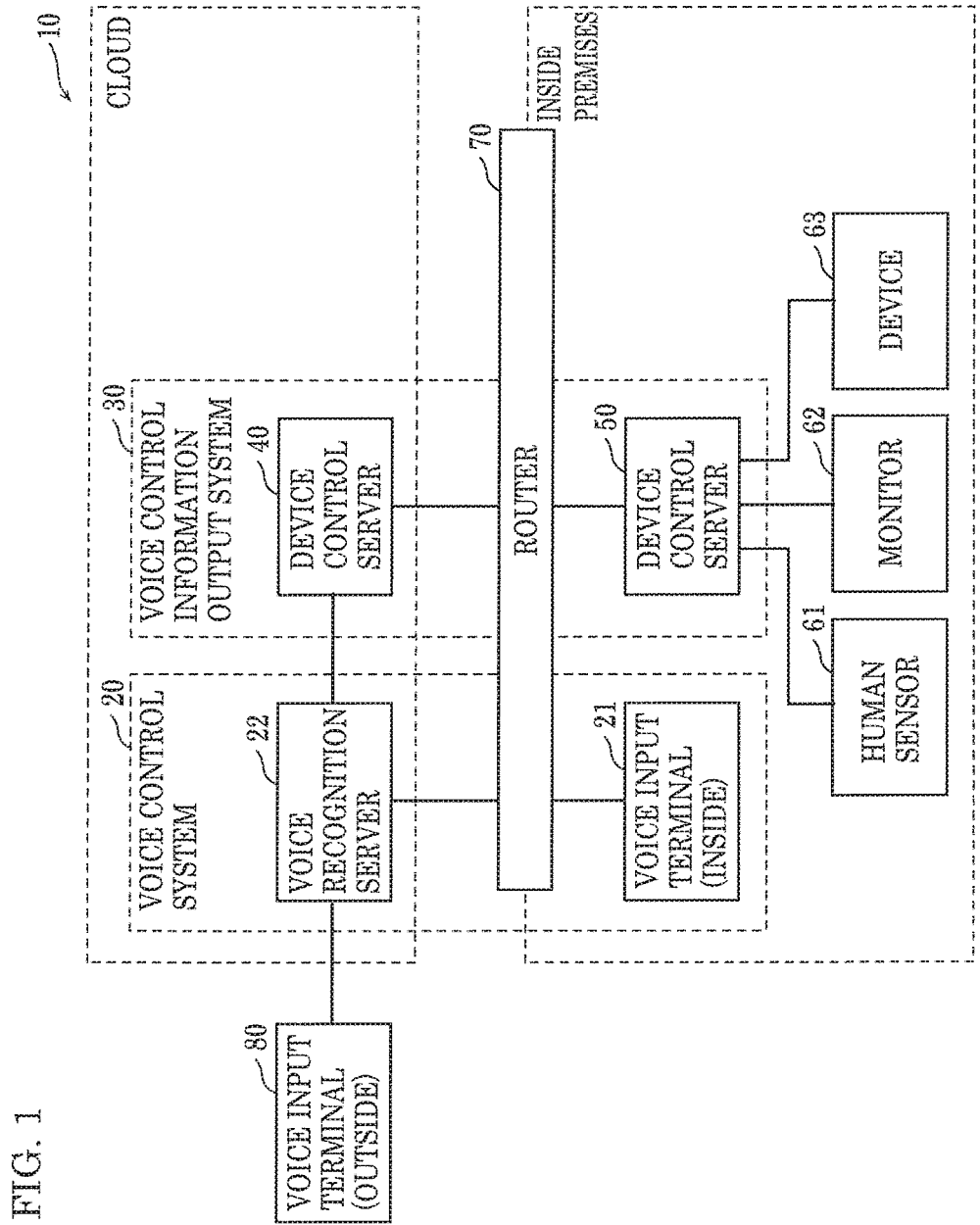
FIG. 1 is a block diagram illustrating the functional configuration of a voice recognition system according to an embodiment.

First, the configuration of a system according to an embodiment will be described. FIG. 1 is a block diagram illustrating the functional configuration of voice recognition system 10 according to the embodiment.

As shown in FIG. 1, voice recognition system 10 according to the embodiment includes voice control system 20, voice control information output system 30, human sensor 61, monitor 62, device 63, and router 70. Voice input terminal 21 of voice control system 20, device controller 50 of voice control information output system 30, human sensor 61, monitor 62, device 63, and router 70 are arranged inside premises. Voice recognition server 22 of voice control system 20 and device control server 40 of voice control information output system 30 are implemented as a cloud (cloud servers). In FIG. 1, voice input terminal 80 located outside the premises is also illustrated.

Configuration of Voice Control System

Voice control system 20 is a system for controlling device 63 to be controlled using voice as an input. Voice control system 20 includes voice input terminal 21 and voice recognition server 22.

Voice input terminal 21 is a voice input interface device that receives a voice of a user or the like. Voice input terminal 21 is an example of a voice obtainment unit. Voice input terminal 21 is a stationary terminal such as a smart speaker, but a mobile terminal such as a smartphone is possible. Voice input terminal 21 may be any device as long as it includes a sound collector such as a microphone, a communication circuit that transmits a voice signal of the received voice to voice recognition server 22, and the like. In the present embodiment, voice input terminal 21 also has a function of outputting a voice sound. Voice input terminal 80 is typically a mobile phone. Voice input terminal 80 has the same functionality as voice input terminal 21, and thus its description is omitted. For example, when voice input terminals 21 and 80 are each implemented as a mobile phone, the mobile phone serves as voice input terminal 21 when used inside premises and serves as voice input terminal 80 when used outside the premises.

Router 70 is a relay that relays data between an inside local communication network and a wide area communication network (e.g., the Internet) such as the outside Internet. For example, router 70 transmits the voice signal of the voice received by voice input terminal 21 to voice recognition server 22 on the cloud.

Voice recognition server 22 is a server that performs a voice recognition process on the voice signal transmitted from voice input terminal 21. A service provider of a voice recognition service provides the voice recognition service through voice recognition server 22. For example, voice recognition server 22 converts the voice signal transmitted from voice input terminal 21 into text information, and further converts the text information into a command corresponding to the text information. The command is an example of voice control information for controlling device 63 based on the voice received by voice input terminal 21. For example, when the text information indicates a text of "Turn on the air conditioner.", such text information is converted into a command for activating the air conditioner. Voice recognition server 22 further transmits the command to device control server 40 of voice control information output system 30.

Configuration of Voice Control Information Output System

Voice control information output system 30 is a system for controlling device 63 and the like arranged inside premises in cooperation with voice control system 20. Voice control information output system 30 includes device control server 40 and device controller 50.

Device control server 40 is a computer including a processor (a microprocessor), a memory, a communication interface (a communication circuit), etc., and controls inside device controller 50 based on the command transmitted from voice recognition server 22. A service provider of a device control service provides the device control service using device control server 40. Device control server 40 can communicate with voice recognition server 22 and device controller 50 via a communication interface.

Device controller 50 is a gateway device including a processor (a microprocessor), a memory, a communication interface (a communication circuit), a user interface (such as a monitor), etc. Device controller 50 is connected with human sensor 61, monitor 62, device 63, and the like which are arranged inside the premises, and has a function of controlling device 63 based on the voice control information. Device controller 50 also determines whether information is displayed on monitor 62 in accordance with the result obtained by human sensor 61, as described in detail below. Device controller 50 can communicate with device control server 40, human sensor 61, monitor 62, and device 63 via a communication interface. It should be noted that the communication between device controller 50 and human sensor 61, monitor 62, and device 63 may be a wired communication or a wireless communication.

Human sensor 61 senses a state of a person in a predetermined area where a voice is to be received by input terminal 21 (i.e., a predetermined inside area), and outputs person information indicating the state of the person. For example, the state of the person refers to whether or not a person is present. Human sensor 61 may be implemented as a single device or a part of another device. For example, human sensor 61 is a device that directly senses whether a person is present inside the premises, and is more specifically a sensor that senses infrared rays emitted from the human body. Human sensor 61 also may be a camera that can sense the state of the person, as well as whether or not a person is present.

Human sensor 61 also may be a device that indirectly senses whether a person is present inside the premises. In this case, human sensor 61 is more specifically a locking system of a front door. In this case, it is determined based on the locking state of the front door whether a person is present inside the premises. For example, when the front door is unlocked, it is determined that a person is present inside the premises. Human sensor 61 also may he an electric power measurement device for measuring the inside power consumption. In this case, it is determined based on inside power consumption information whether a person is present inside the premises. For example, when the inside power consumption is at least a predetermined value, it is determined that a person is present inside the premises.

Human sensor 61 also may be a sound collector different from voice input terminal 21. In this case, it is determined based on the obtained voice condition whether a person is present inside the premises. For example, when the obtained voice has a predetermined sound pressure level or more, it is determined that a person is present inside the premises.

Human sensor 61 may be a sensor that senses an IC tag worn by a user or a built-in IC tag of a mobile terminal carried by a user. It should be noted that when human sensor 61 is a sensor capable of sensing an IC tag, it is possible to detect whether a specific person is present in the predetermined area.

Monitor 62 is a display for displaying a content related to the voice control information, and is a display included in a tablet, a smart phone, a television, etc. More specifically, based on display-related information for displaying the content related to the voice control information, a tablet, a smart phone, a television, etc. displays the content related to the voice control information on monitor 62. It should be noted that monitor 62 may be a display included in device controller 50.

For example, device 63 is a home appliance such as an air conditioner, but a device other than home appliances such as a locking system of a fixture (e.g. a front door) is possible.

Specific Configuration of Device Controller

Figure 2:
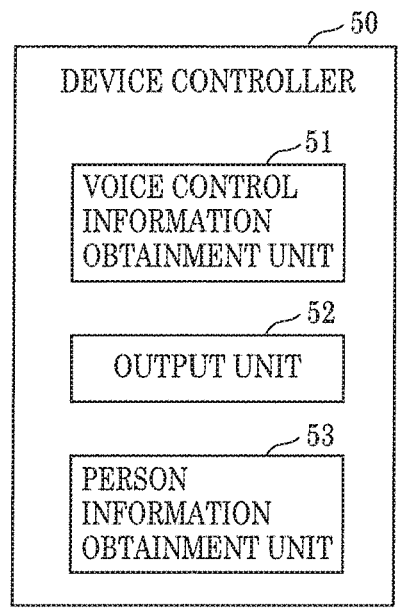
FIG. 2 is a block diagram illustrating the functional configuration of a device controller according to the embodiment.

FIG. 2 is a block diagram illustrating the functional configuration of device controller 50 according to the embodiment.

In the embodiment, device controller 50 includes voice control information obtainment unit 51, output unit 52, and person information obtainment unit 53 which are each an inventive functional component in voice control information output system 30.

Voice control information obtainment unit 51 obtains the voice control information from voice control system 20 that outputs the voice control information for controlling device 63 based on the voice received by voice input terminal 21 or 80. In the present embodiment, voice control information obtainment unit 51 obtains the voice control information from voice control system 20 via device control server 40.

Output unit 52 outputs the display-related information for displaying a content related to the voice control information. In the present embodiment, output unit 52 outputs the display-related information to monitor 62. Output unit 52 also outputs control information for controlling device 63 based on the voice control information.

Person information obtainment unit 53 obtains person information indicating a state of a person in the predetermined area outputted by human sensor 61.

Voice control information obtainment unit 51, output unit 52, and person information obtainment unit 53 are implemented by causing a processor to execute a program stored on a memory included in device controller 50.

It should be noted that voice control information obtainment unit 51, output unit 52, and person information obtainment unit 53 may be separately arranged in device control server 40 and device controller 50 of voice control. information output system 30, or all of the functional components may be included in device control server 40.

Operation Example 1 of Voice Control Information Output System

Figure 3:
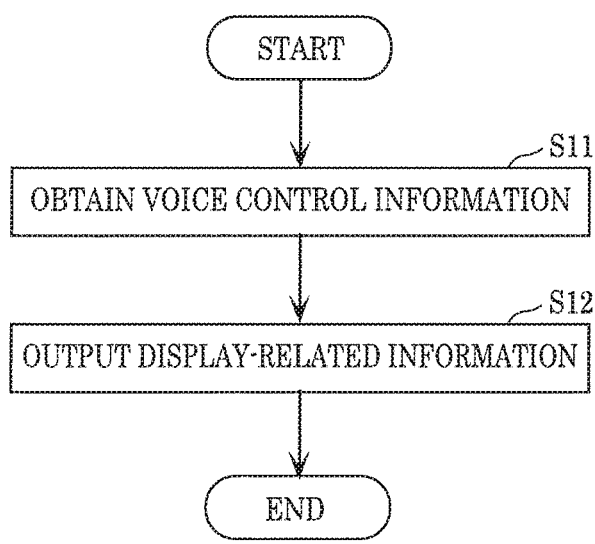
FIG. 3 is a flowchart of operation example 1 of a voice control information output system according to the embodiment.

Next, operation example 1 of voice control information output system 30 will be described. FIG. 3 is a flowchart of operation example 1 of voice control information output system 30.

First, voice control information obtainment unit 51 obtains the voice control information (step S11). Next, output unit 52 outputs the display-related information for displaying a content related to the voice control information (step S12). With this, the content related to the voice control information is displayed on monitor 62, and thus a user can visually check the information related to the voice control information (display-related information). The specific examples of the display-related information will be described in FIG. 6 though FIG. 11 below.

As the case where such voice recognition system 10 is used, the case where a user stays inside or the case where a user stays outside will be taken. In the case where a user stays inside, the user talks to voice input terminal 21 to control device 63, and the content related to the voice control information is displayed on monitor 62 in response to the talking. On the other hand, in the case where a user stays outside, even when the user talks to voice input terminal 80 (such as a mobile phone) to control device 63, the content related to the voice control information need not be displayed on monitor 62. Instead, when a user different from the user who has talked outside stays inside and the content related to the voice control information has been displayed on monitor 62, the inside user does not understand why monitor 62 has been turned on and may misunderstand that errors has occurred.

Accordingly, voice control information output system 30 (in the present embodiment, device controller 50) includes person information obtainment unit 53, and output unit 52 outputs the display-related information in accordance with the state of the person obtained by person information obtainment unit 53.

Operation Example 2 of Voice Control Information Output System

Figure 4:
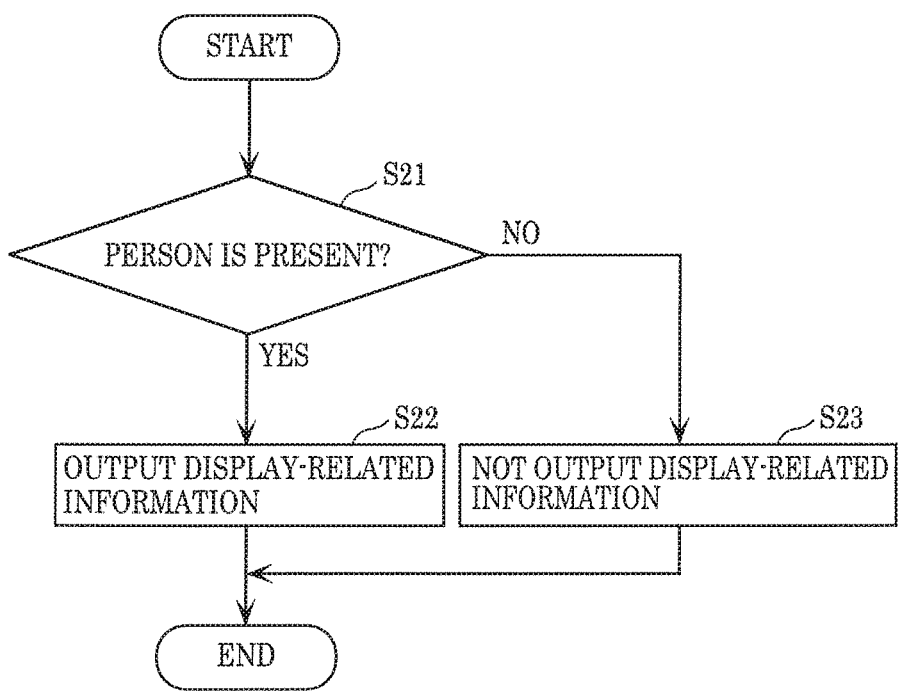
FIG. 4 is a flowchart of operation example 2 of the voice control information output system according to the embodiment.

This will be described as operation example 2 of voice control information output system 30 based on the state of the person indicated by the person information obtained by person information obtainment unit 53. FIG. 4 is a flowchart of operation example 2 of voice control information output system 30 according to the embodiment. Here, person information obtainment unit 53 obtains the person information indicating the state of the person in the predetermined inside area. For example, the person information is information indicating whether or not a person is present.

First, output unit 52 determines whether a person is present in the predetermined area, more specifically, whether the person information obtained by person information obtainment unit 53 indicates that a person is present in the predetermined area (step S21).

When it is determined that the person information indicates that a person is present in the predetermined area (Yes at step S21), output unit 52 outputs the display-related information (step S22). On the other hand, when it is determined that the person information indicates that no person is present in the predetermined area (No at step S21), output unit 52 does not output the display-related information (step S23). Operation example 2 will be described in detail with reference to FIG. 5.

Figure 5:
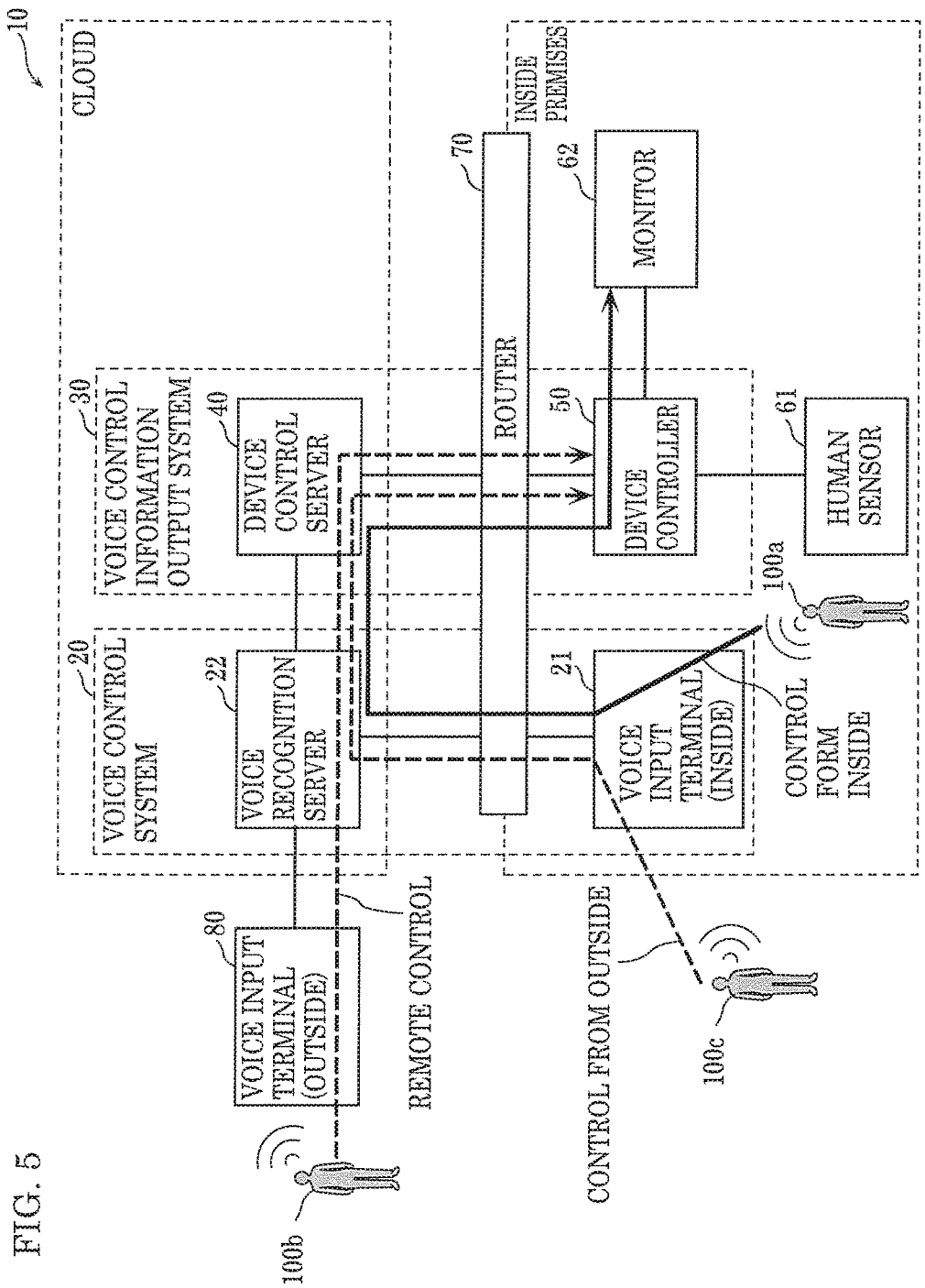
FIG. 5 is a diagram for illustrating operation example 2 of the voice control information output system according to the embodiment.

FIG. 5 is a diagram for illustrating operation example 2 of voice control information output system 30 according to the embodiment.

When user 100*a* is present, in the predetermined inside area (when human sensor 61 senses that a person is present in the predetermined area), voice input terminal 21 receives a voice of user 100*a* and transmits the voice signal of the received voice to voice recognition server 22. Voice recognition server 22 performs the voice recognition process on the voice signal transmitted from voice input terminal 21, and transmits, to voice control information output system 30, a voice control signal converted from the voice signal. At this time, the person information obtained from human sensor 61 by person information obtainment unit 53 indicates that a person is present in the predetermined area, and thus output unit 52 transmits, to monitor 62, the display-related information for displaying the content related to the voice control signal. With this, user 100a can visually check the display-related information by viewing monitor 62.

Next, when no user is present in the predetermined inside area and device 63 is remotely controlled by user 100b (e.g., a person involved in a facility to which voice control information output system 30 is applied), voice input terminal 80 receives a voice of user 100b and transmits the voice signal of the received voice to voice recognition server 22. Voice recognition server 22 performs the voice recognition process on the voice signal transmitted from voice input terminal 80, and transmits, to voice control information output system 30, the voice control signal converted from the voice signal. At this time, the person information obtained from human sensor 61 by person information obtainment unit 53 indicates that no person is present in the predetermined area, and thus output unit 52 does not transmit, to monitor 62, the display-related information for displaying the content related to the voice control signal. With this, even when another user is present in an area other than the predetermined inside area, it is possible to prevent the monitor from being turned on.

Next, when no user is present in the predetermined inside area and for example, outside malicious user 100c attempts to input a voice into inside voice input terminal 21 from outside using a loud voice, voice input terminal 21 may receive a voice of user 100c and transmit the voice signal of the received voice to voice recognition server 22. Voice recognition server 22 performs the voice recognition process on the voice signal transmitted from voice input terminal 21, and transmits, to voice control information output system 30, the voice control signal converted from the voice signal. At this time, the person information obtained from human sensor 61 by person information obtainment unit 53 indicates that no person is present in the predetermined area, and thus output unit 52 does not transmit, to monitor 62, the display-related information for displaying the content related to the voice control signal. With this, even when a user is present in an area other than the predetermined inside area, it is possible to prevent the monitor from being turned on.

In this way, when no user who wants to control device 63 using voice input terminal 21 is present in the predetermined inside area, it is possible not to output the display-related information to monitor 62 even if device 63 is controlled from outside.

Specific Examples of Display-Related Information

Next, specific examples of the display-related information will be described with reference to FIGS. 6 through 11.

FIGS. 6 through 11 are each a diagram for illustrating an example of the display-related information. In FIGS. 6 through 9, device 63 is implemented as an air conditioner.

For example, the display-related information includes information about the state of device 63 controlled based on the voice control information. This will be described with reference to FIG. 6.

Figure 6:
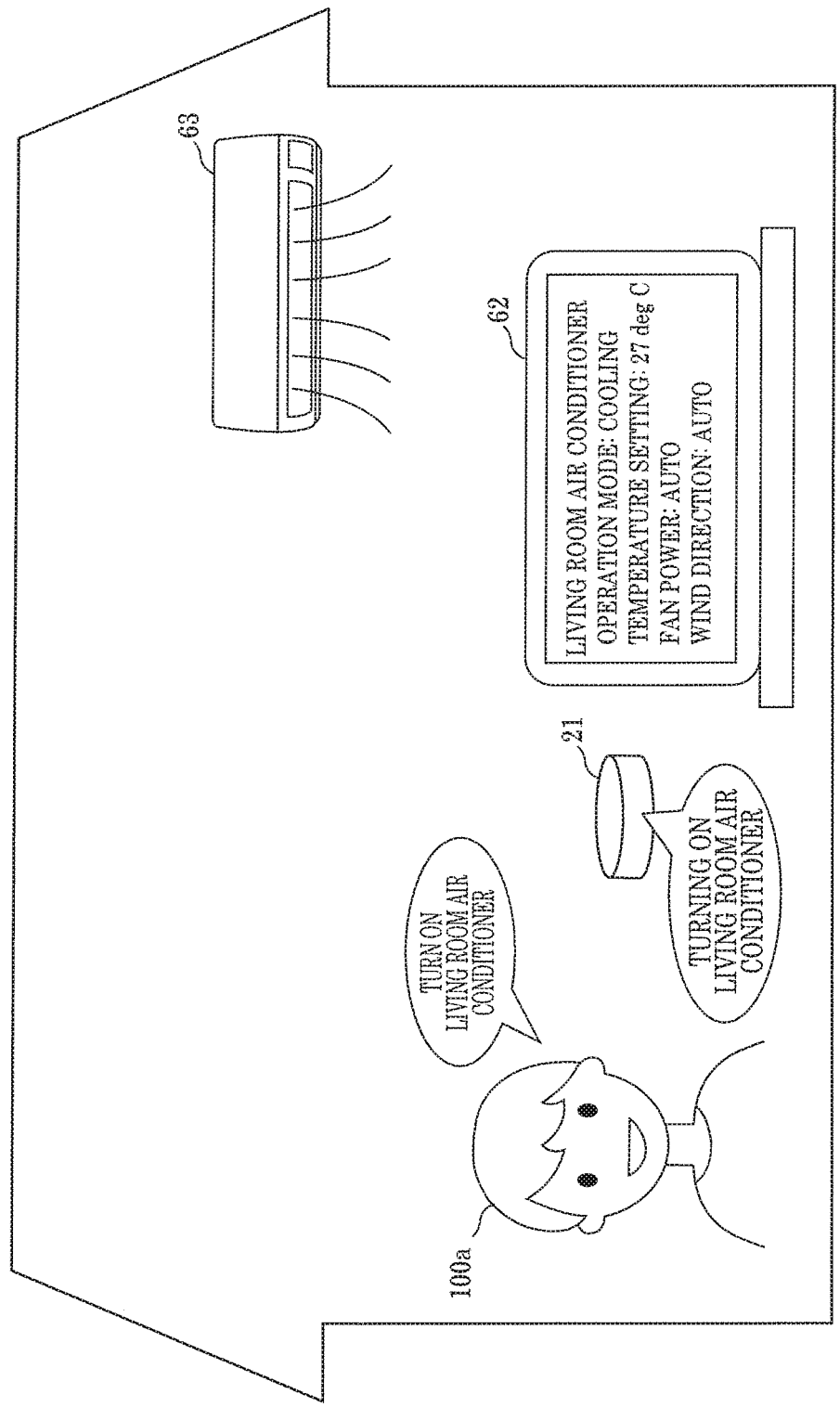
FIG. 6 is a diagram for illustrating an example of display-related information.

As shown in FIG. 6, voice input terminal 21 receives a voice of "Turn on the living room air conditioner." of user 100a. Voice recognition server 22 performs the voice recognition process on the voice signal transmitted from voice input terminal 21 to generate the voice control signal for controlling device 63, and voice control information output system 30 controls device 63 based on the generated voice control signal. Here, voice control information output system 30 activates device 63 (the air conditioner). Simultaneously, voice control information output system 30 transmits, to voice control system 20, information indicating that device 63 is activated, and voice input terminal 21 outputs a voice sound of "Turning on the living room air conditioner.", for example. At this time, monitor 62 displays the information about the state of device 63 controlled based on the voice control information. For example, when device 63 is an air conditioner, the information about the state of device 63 is information such as operation mode, temperature setting, fan power, or wind direction of the air conditioner. With this, user 100a can visually check the state of device 63. Thus, for example, when the current state of device 63 is not a state desired by user 100a, user 100a can give an instruction to change the state of device 63.

Furthermore, for example, the display-related information includes warning information related to the control of device 63. This will be described with reference to FIG. 7.

Figure 7:
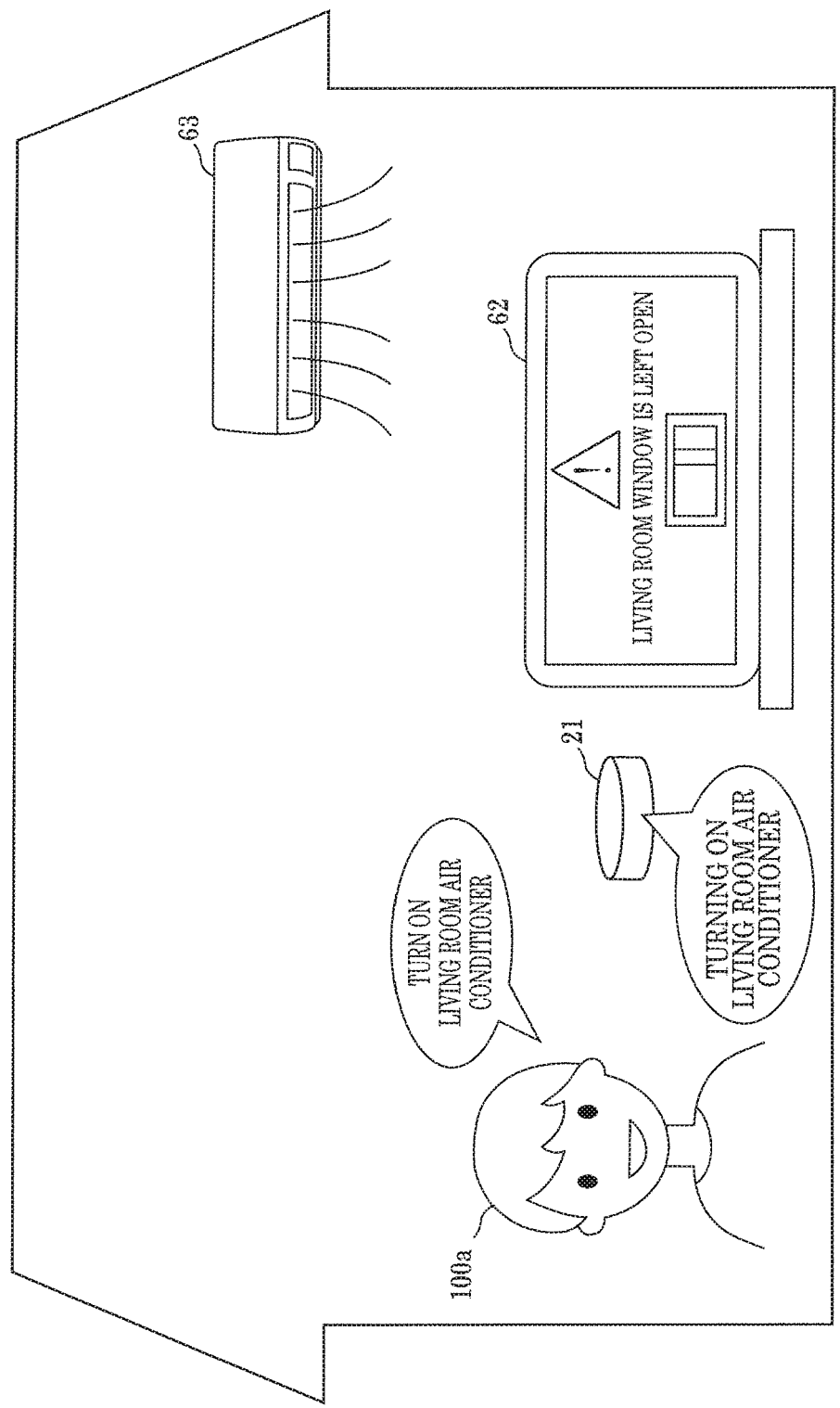
FIG. 7 is a diagram for illustrating another example of the display-related information.

As shown in FIG. 7, voice input terminal 21 receives a voice of "Turn on the living room air conditioner." of user 100a. Voice recognition server 22 performs the voice recognition process on the voice signal transmitted from voice input terminal 21 to generate the voice control signal for controlling device 63, and voice control information output system 30 controls device 63 based on the generated voice control signal. Here, voice control information output system 30 activates device 63 (the air conditioner). At this time, device 63 (the air conditioner arranged in the living room) is associated with an open-close sensor or the like that is attached to a living room window and senses whether the window is open or closed, and thus monitor 62 displays the warning information related to the control of device 63. For example, the warning information is information indicating that a window in a room (i.e., the living room) equipped with device 63 (i.e., the air conditioner) to be controlled is open. With this, user 100a can visually check the warning information related to the control of device 63. Thus, for example, user 100a can efficiently operate the air conditioner arranged in the living room by closing the living room window.

Furthermore, for example, the display-related information includes information for controlling device 63 based on the voice control information. More specifically, the information for controlling device 63 includes information for identifying the details of the control of device 63, or information for identifying device 63 to be controlled. This will be described with reference to FIG. 8.

Figure 8:
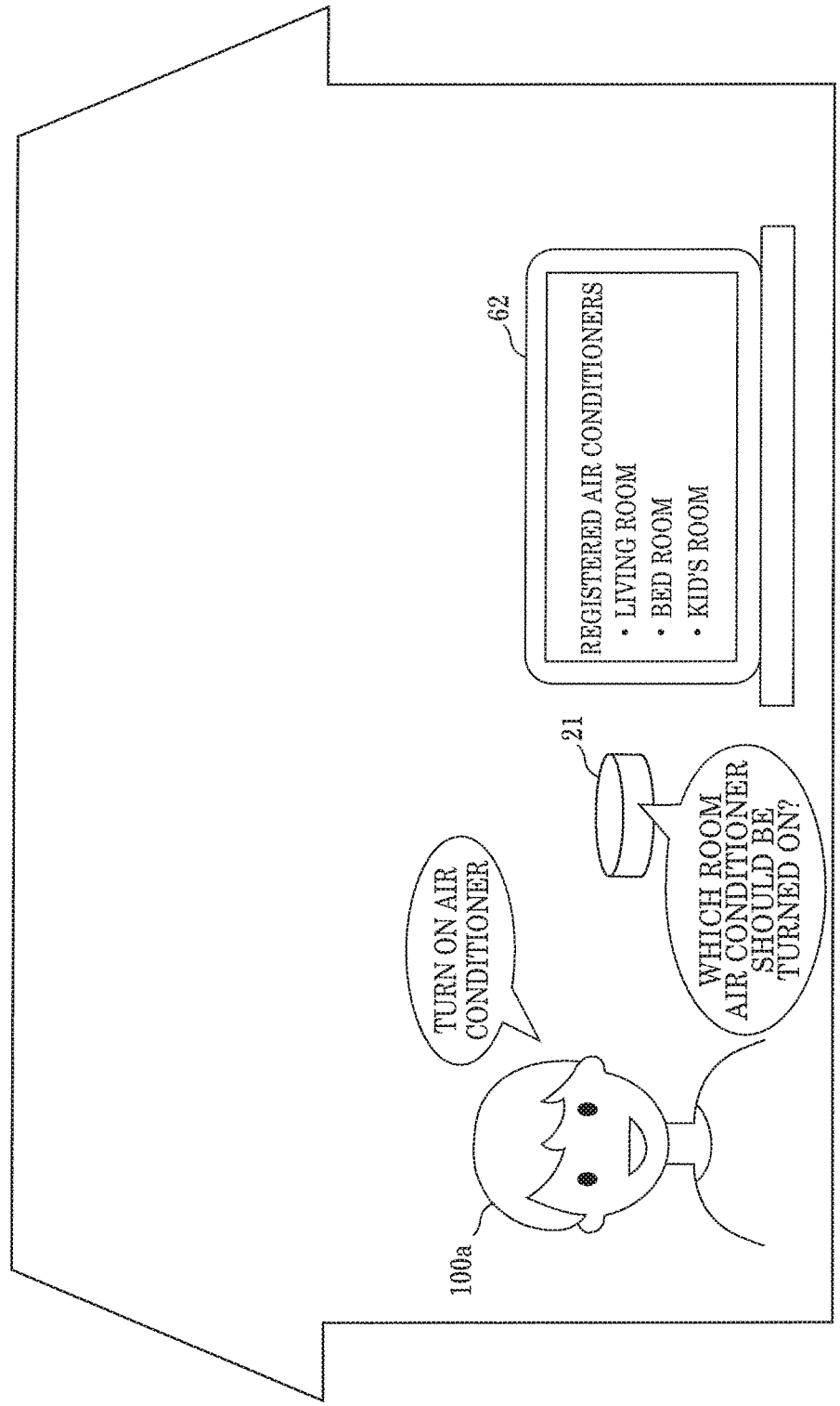
FIG. 8 is a diagram for illustrating another example of the display-related information.

As shown in FIG. 8, voice input terminal 21 receives a voice of "Turn on the air conditioner." of user 100a. Voice recognition server 22 performs the voice recognition process on the voice signal transmitted from voice input terminal 21 to generate the voice control signal for controlling device 63, and voice control information output system 30 controls device 63 based on the generated voice control signal. At this time, when there are three air conditioners controllable by voice control information output system 30, voice control information output system 30 cannot determine only from a voice of "Turn on the air conditioner." of user 100a which air conditioner should be turned on. Accordingly, voice control information output system 30 transmits, to voice control system 20, information indicating that it is unclear which air conditioner should be turned on, and voice input terminal 21 outputs a voice sound of "Which room air conditioner should be turned on?", for example. At this time, monitor 62 displays the information for identifying device 63 to be controlled. For example, this information is information indicating that the living room, the bed room, and the kid's room are possible as an area equipped with the controllable air conditioner (the registered air conditioner).

With this, user 100*a* can visually check which room air conditioner can be turned on, and thus can activate the desired room air conditioner.

It should be noted that although not shown in the figure, for example, monitor 62 may display the details of possible control to be performed by device 63 (such as operation in cooling/heating mode, or change in temperature, air volume, or wind direction) as information for identifying the details of the control of device 63 With this, user 100*a* can visually check how the air conditioner can be controlled, and thus can operate the air conditioner based on the details of the desired control.

Furthermore, for example, when device 63 cannot be controlled based on the voice control information, display-related information includes at least one of information about the failure to control device 63 and information for placing device 63 into the state of being controlled based on the voice control information. This will be described with reference to FIG. 9.

Figure 9:
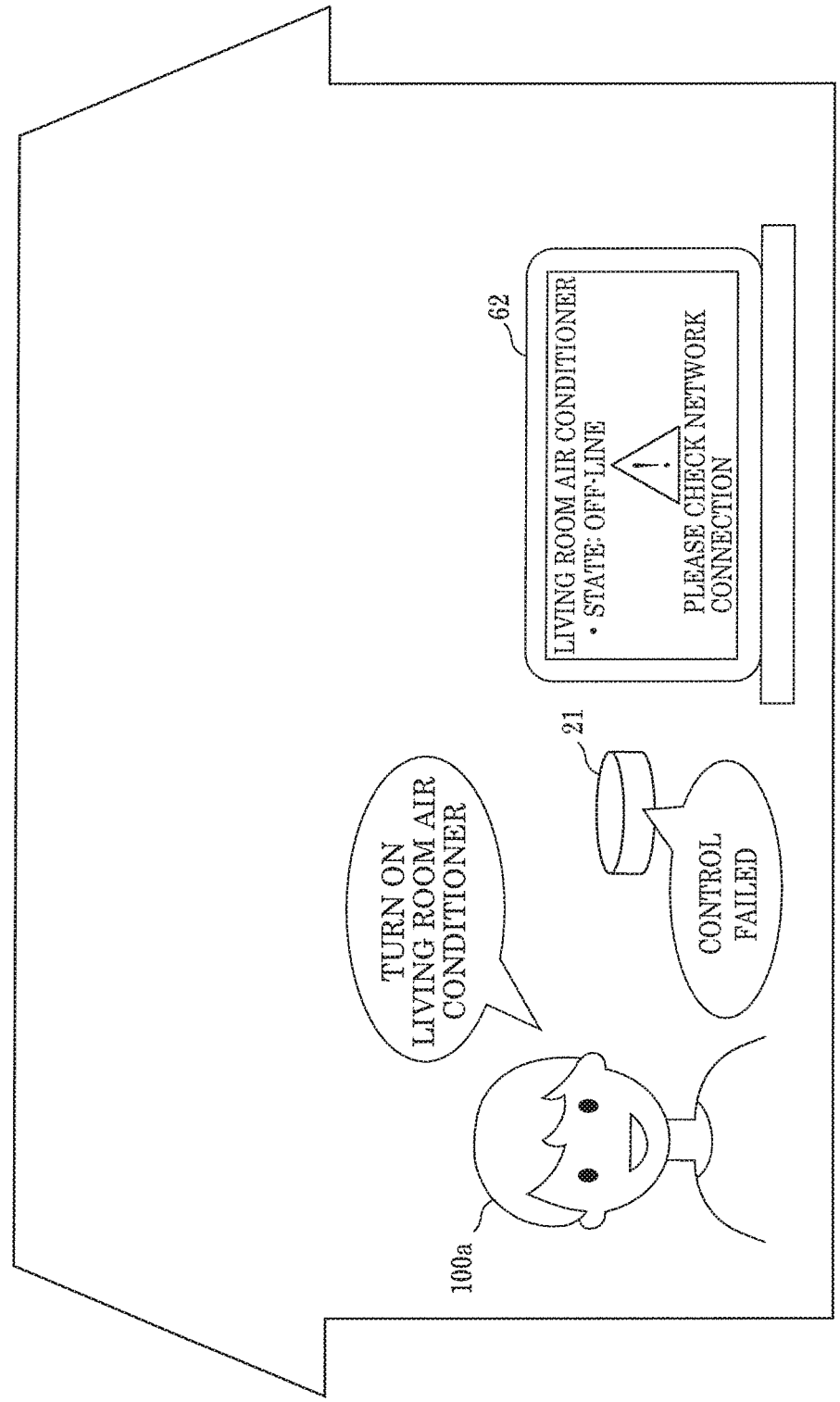
FIG. 9 is a diagram for illustrating another example of the display-related information.

As shown in FIG. 9, voice input terminal 21 receives a voice of "Turn on the living room air conditioner." of user 100*a*. Voice recognition server 22 performs the voice recognition process on the voice signal transmitted from voice input terminal 21 to generate the voice control signal for controlling device 63, and voice control information output system 30 controls device 63 based on the generated voice control signal. However, when device 63 is broken or the connection between device controller 50 and device 63 has a problem, voice control information output system 30 may not control device 63. In this case, voice control information output system 30 transmits, to voice control system 20, information indicating the failure to control the air conditioner, and voice input terminal 21 outputs a voice sound of "The control failed.", for example. At this time, when voice control information output system 30 knows that the failure to control is caused by the network connection problem, monitor 62 displays information for placing device 63 into the state of being controlled based on the voice control information (here, the state in which the air conditioner is activated). For example, this information is information for urging a user to solve the network connection problem. With this, user 100*a* can visually check how the air conditioner is placed into the state of being activated, and thus can activate the air conditioner by solving the network connection problem.

It should be noted that although not shown in the figure, monitor 62 may display the information about the failure to control device 63 (such as "The control failed."). With this, user 100*a* can visually check the failure to activate the air conditioner.

Furthermore, for example, the voice control information includes answer information to a voice received by voice input terminal 21, and the display-related information includes information related to the answer information. This will be described with reference to FIG. 10.

Figure 10:
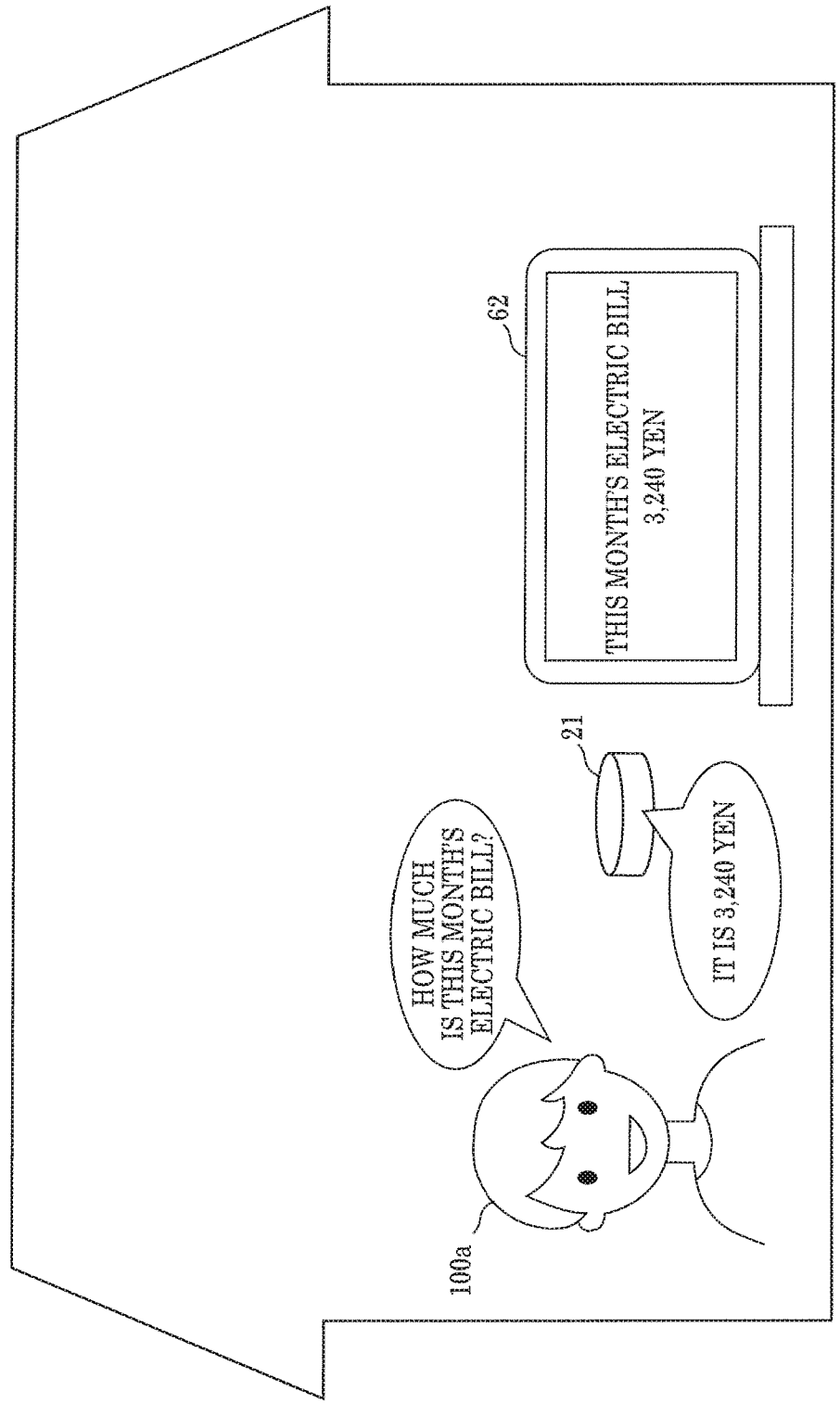
FIG. 10 is a diagram for illustrating another example of the display-related information.

As shown in FIG. 10, voice input terminal 21 receives a voice of "How much is this month's electric bill?" of user 100*a*. Voice recognition server 22 performs the voice recognition process on the voice signal transmitted from voice input terminal 21 to generate the voice control signal for controlling device 63. Here, device 63 is a device or the like capable of managing the electric bill of user 100*a*, and the voice control signal for controlling device 63 serves as the answer information for generating an answer to the voice received by voice input terminal 21. Voice control information output system 30 transmits the generated answer to voice control system 20, and voice input terminal 21 outputs a voice sound of "It is 3,240 yen.", for example. As the information related to the answer information, monitor 62 displays this month's electric bill which is the answer. With this, user 100*a* can visually check the answer (i.e., this month's electric bill).

Figure 11:
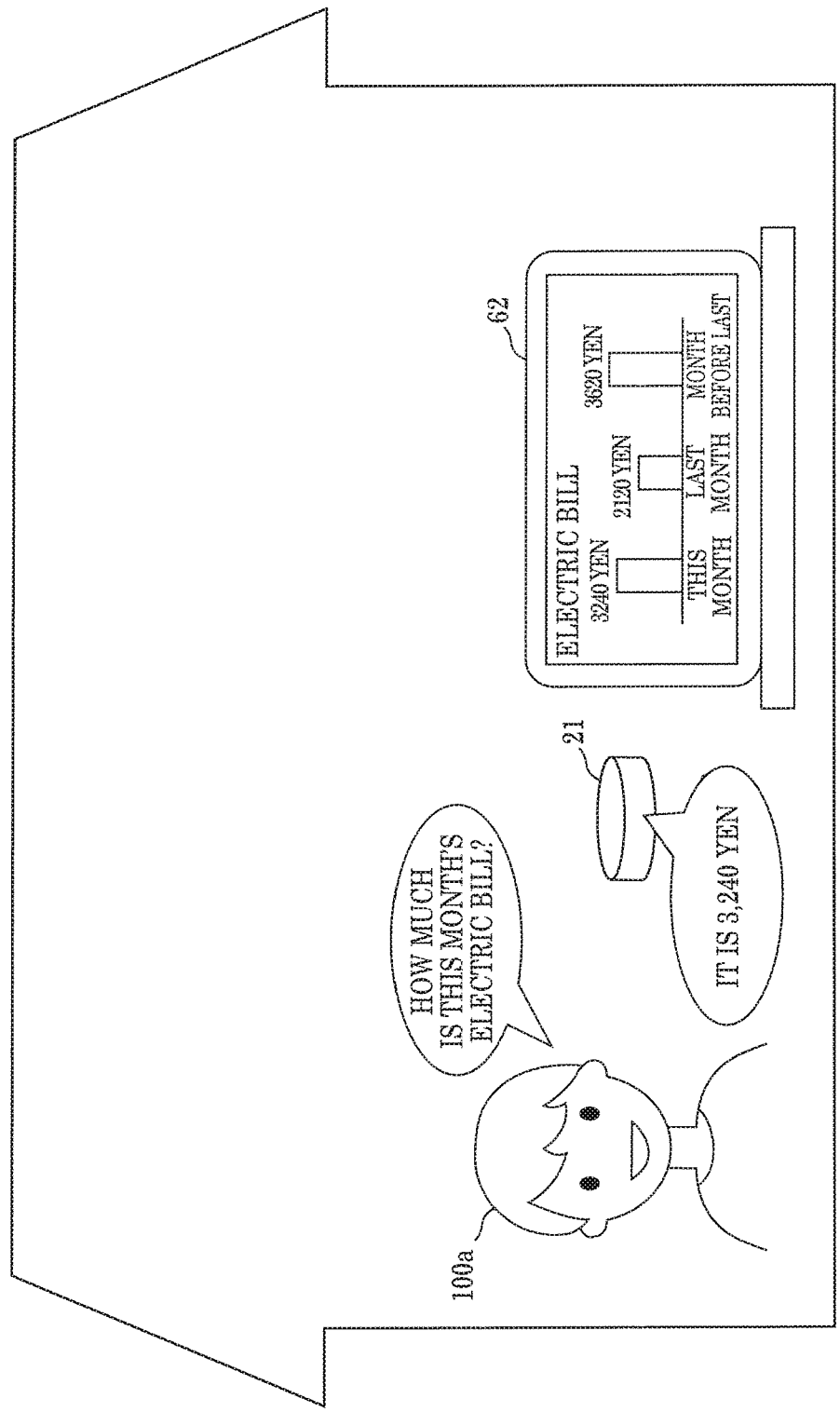
FIG. 11 is a diagram for illustrating another example of the display-related information.

Furthermore, the information related to the answer information may include more detailed information than the answer information. More specifically, monitor 62 may display not only this month's electric bill as shown in FIG. 10, but also a graph or information about last month's electric bill, etc. as well as this month's electric bill as the detailed information as shown in FIG. 11.

Advantageous Effects, etc.

As described above, voice control information output system 30 includes: voice control information obtainment unit 51 that obtains voice control information for controlling device 63 based on a voice received by a voice obtainment unit (voice input terminal 21 or 80), from voice control system 20 that outputs the voice control information; and output unit 52 that outputs display-related information for displaying a content related to the voice control information.

With this, the display-related information for displaying the content related to the voice control information is provided to monitor 62 or the like, and thus user 100*a* can visually check the information related to voice control information.

Furthermore, for example, the display-related information includes information about a state of device 63 controlled based on the voice control information.

With this, user 100*a* can visually check the state of device 63. For example, user 100*a* can easily recognize a difference between the current state and the desired state of device 63.

Furthermore, for example, the display-related information includes information for controlling device 63 based on the voice control information. More specifically, the information for controlling device 63 includes information for identifying details of the control of device 63 or information for identifying device 63 to be controlled.

With this, user 100*a* can visually check the information for identifying the details of the control of device 63, or information for identifying device 63 to be controlled. For example, user 100*a* can easily give an instruction on the details of the desired control or a device to be controlled.

Furthermore, for example, the voice control information includes answer information to the voice received by the voice obtainment unit (voice input terminal 21 or 80), and the display-related information includes information related to the answer information.

With this, user 100*a* can visually check the information related to the answer information.

Furthermore, for example, the information related to the answer information includes more detailed information than the answer information.

With this, user 100*a* can visually check the more detailed information than the answer information.

Furthermore, for example, when device 63 fails to be controlled based on the voice control information, the display-related information includes at least one of information about the failure to control device 63 and information for placing device 63 into a state of being controlled based on the voice control information.

With this, user 100*a* can visually check the information about the failure to control device 63 or the information for placing device 63 into the state of being controlled based on the voice control information. For example, user 100*a* can easily recognize a problem occurred in device 63 or the like or how to address the problem.

Furthermore, for example, the display-related information includes warning information related to the control of device 63.

With this, user 100a can visually check the warning information related to the control of device 63.

Furthermore, for example, the voice control information output system 30 further includes person information obtainment unit 53 that obtains person information indicating a state of a person in a predetermined area, in which output unit 52 outputs the display-related information based on the state of the person indicated by the person information obtained by person information obtainment unit 53. More specifically, the person information is information indicating whether or not a person is present, and output unit 52 outputs the display-related information when the person information indicates that a person is present in the predetermined area, and does not output the display-related information when the person information indicates that no person is present in the predetermined area.

With this, when no user who wants to control device 63 using voice input terminal 21 is present in the predetermined inside area, it is possible not to output the display-related information to monitor 62 even if device 63 is controlled from outside.

Other Embodiments

Although a preferred embodiment has been described above, the present invention is not limited to the foregoing embodiment.

For example, in the foregoing embodiment, the state of the person refers to whether or not a person is present. Although output unit 52 outputs the display-related information when a person is present and does not output the display-related information when no person is present, the present invention is not limited to this. For example, when monitor 62 is a TV display and person information obtainment unit 53 obtains information indicating that the state of the person in the predetermined area is a state of watching TV, output unit 52 need not output the display-related information. With this, when a person is watching TV, it is possible to prevent the content related to the voice control information from being displayed on the TV display.

Furthermore, for example, in the foregoing embodiment, although voice control information output system 30 includes person information obtainment unit 53, that is not necessary. In other words, voice control information output system 30 need not have a function of outputting the display-related information based on the state of the person in the predetermined inside area.

Furthermore, the present invention can be implemented as not only voice control information output system 30 but also a voice control information output method including steps (processes) performed by the respective components included in voice control formation output system 30.

More specifically, as shown in FIG. 3, the voice control information output method includes: obtaining voice control information for controlling device 63 based on a voice received by a voice obtainment unit (voice input terminal 21 or 80), from voice control system 20 that outputs the voice control information (step S11); and outputting display-related information for displaying a content related to the voice control information (step S12).

For example, these steps may be executed by a computer (a computer system). Moreover, the present invention can be implemented as a program for causing a computer (clean-up assistance program) to execute the steps included in the method. Furthermore, the present invention can be implemented as a non-transitory computer-readable recording medium such as a CD-ROM or the like having the program recorded thereon.

For example, when the present invention is implemented as a program (a software), each of the steps is performed by executing the program using a hardware resource such as a CPU, a memory, an input-output circuit, etc. in a computer. In other words, the CPU obtains data from the memory, the input-output circuit, or the like to perform operations, or outputs the operation results to the memory, the input-output circuit, or the like, and thereby each step is performed.

Moreover, each of the components included in voice control information output system 30 according to the foregoing embodiment may be implemented as a dedicated or a general-purpose circuit.

Moreover, each of the components included in voice control information output system 30 according to the foregoing embodiment may be implemented as a large scale integration (LSI) which is an integrated circuit (IC).

Moreover, the IC is not limited to the LSI, and may be implemented by a dedicated circuit or a general-purpose processor. A field programmable gate array (FPGA) which is programmable or a reconfigurable processor in which the connection and configuration of circuit cells in a LSI are reconfigurable may be applicable.

Furthermore, in the event that an advance in or derivation from semiconductor technology brings about an integrated circuitry technology whereby an LSI is replaced, each of the components included in voice control information output system 30 may be obviously integrated using such new technology.

Embodiments arrived at by a person skilled in the art making various modifications to the embodiment as well as embodiments realized by arbitrarily combining structural components and functions in the embodiment which do not depart from the essence of the present invention are included in the present invention.

The invention claimed is:

1. A voice control information output system, comprising:
a voice control information obtainment unit that obtains voice control information for controlling a device based on a voice received by a voice obtainment unit, from a voice control system that outputs the voice control information;
an output unit that outputs, to a monitor, display-related information for displaying a content related to the voice control information, and outputs, to the device, control information for controlling the device; and
a person information obtainment unit that obtains person information indicating a state of a person in a predetermined area, wherein
the output unit outputs the display-related information based on the state of the person indicated by the person information obtained by the person information obtainment unit,
the person information is information indicating whether or not a person is present,
the output unit outputs the display-related information when the person information indicates that a person is present in the predetermined area, and does not output the display-related information when the person information indicates that no person is present in the predetermined area, and
the monitor is separate from the device.

2. The voice control information output system according to claim 1, wherein
the display-related information includes information about a state of the device controlled based on the voice control information.

3. The voice control information output system according to claim 1, wherein
the display-related information includes information for controlling the device based on the voice control information.

4. The voice control information output system according to claim 3, wherein
the information for controlling the device includes information for identifying details of the control of the device or information for identifying the device to be controlled.

5. The voice control information output system according to claim 1, wherein
the voice control information includes answer information to the voice received by the voice obtainment unit, and
the display-related information includes information related to the answer information.

6. The voice control information output system according to claim 5, wherein
the information related to the answer information includes more detailed information than the answer information.

7. The voice control information output system according to claim 1, wherein
when the device fails to be controlled based on the voice control information, the display-related information includes at least one of information about the failure to control the device and information for placing the device into a state of being controlled based on the voice control information.

8. The voice control information output system according to claim 1, wherein
the display-related information includes warning information related to the control of the device.

9. The voice control information output system according to claim 1, wherein
the voice obtainment unit is provided both inside and outside the predetermined area.

10. A voice control information output method, comprising:
obtaining voice control information for controlling a device based on a voice received by a voice obtainment unit, from a voice control system that outputs the voice control information;
outputting, to a monitor, display-related information for displaying a content related to the voice control information, and outputting, to the device, control information for controlling the device; and
obtaining person information indicating a state of a person in a predetermined area, wherein
in the outputting, the display-related information is outputted based on the state of the person indicated by the person information obtained in the obtaining of person information,
the person information is information indicating whether or not a person is present,
in the outputting, the display-related information is outputted when the person information indicates that a person is present in the predetermined area, and the display-related information is not outputted when the person information indicates that no person is present in the predetermined area, and
the monitor is separate from the device.

11. A non-transitory computer-readable recording medium for use in a computer, the recording medium having a computer program recorded thereon for causing the computer to execute the voice control information output method according to claim 10.

* * * * *